US009843202B2

(12) United States Patent
Kdoshim et al.

(10) Patent No.: US 9,843,202 B2
(45) Date of Patent: Dec. 12, 2017

(54) SYSTEM AND METHOD FOR INCREASING OPERATIONAL RANGE OF INDUCTIVE POWER TRANSMISSION

(71) Applicant: POWERMAT TECHNOLOGIES LTD., Neve Ilan (IL)

(72) Inventors: Moti Kdoshim, Modiin (IL); Moti Ashery, Mevaseret Zion (IL); Elieser Mach, Rosh Tzurim (IL); Oola Greenwald, Mevasseret Zion (IL); Itamar Cohen-Ogen, Tel-Aviv (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 282 days.

(21) Appl. No.: 14/759,377

(22) PCT Filed: Sep. 23, 2014

(86) PCT No.: PCT/IL2014/050847
§ 371 (c)(1),
(2) Date: Jul. 6, 2015

(87) PCT Pub. No.: WO2015/044943
PCT Pub. Date: Apr. 2, 2015

(65) Prior Publication Data
US 2015/0340880 A1 Nov. 26, 2015

Related U.S. Application Data

(60) Provisional application No. 61/881,459, filed on Sep. 24, 2013.

(51) Int. Cl.
*H02J 5/00* (2016.01)
*H02J 7/02* (2016.01)
(Continued)

(52) U.S. Cl.
CPC .............. *H02J 5/005* (2013.01); *H02J 7/025* (2013.01); *H02J 17/00* (2013.01); *H02J 50/10* (2016.02); *H02J 50/80* (2016.02)

(58) Field of Classification Search
CPC ........... H01F 38/14; H02J 5/005; H02J 7/025; H02J 17/00; H02J 50/12; H02J 50/80;
(Continued)

(56) References Cited

U.S. PATENT DOCUMENTS 6,313,612 B1 * 11/2001 Honda .................. G04C 10/00
320/139
2004/0145342 A1 7/2004 Lyon
(Continued)

FOREIGN PATENT DOCUMENTS

WO 2011036659 A2 3/2011
WO 2011154781 A1 12/2011
WO 2012007942 A2 1/2012

OTHER PUBLICATIONS

Int'l. Search Report and Written Opinion of Corresponding International Application No. PCT/IL2014/050847, Issued by Israel Patent Office, dated Jan. 27, 2015.

*Primary Examiner* — Levi Gannon
(74) *Attorney, Agent, or Firm* — William Dippert; Laurence Greenberg; Werner Stemer

(57) ABSTRACT

An inductive power transfer system and methods for controlling efficient operational wireless power transfer to an electrical device. The system includes an inductive power outlet, an inductive power receiver and a signal transfer system communicating power transfer instruction from receiver to outlet, while transferring power from the outlet to the receiver. The present invention relates to wireless power transfer systems and methods incorporating a current limiter activation mechanism to allow power transfer at an extended operational range, providing a technical solution when an inductive power outlet and an inductive power receiver are laterally misaligned.

20 Claims, 10 Drawing Sheets

(51) Int. Cl.
*H02J 17/00* (2006.01)
*H02J 50/80* (2016.01)
*H02J 50/10* (2016.01)

(58) Field of Classification Search
CPC .. H04B 5/0031; H04B 5/0037; H04B 5/0075; H04B 5/0093
USPC .......................................................... 307/104
See application file for complete search history.

(56) References Cited

U.S. PATENT DOCUMENTS

| | | | |
|---|---|---|---|
| 2005/0068019 A1 | 3/2005 | Nakamura et al. | |
| 2009/0001818 A1* | 1/2009 | Ilsaka | H02J 7/0011 307/104 |
| 2010/0084918 A1* | 4/2010 | Fells | H02J 5/005 307/32 |
| 2012/0193993 A1 | 8/2012 | Azancot et al. | |
| 2012/0205988 A1* | 8/2012 | Tanabe | H02J 7/025 307/104 |
| 2012/0293009 A1* | 11/2012 | Kim | H02H 7/1252 307/104 |
| 2014/0285026 A1* | 9/2014 | Hori | H02J 5/005 307/104 |
| 2016/0006263 A1* | 1/2016 | Shichino | H02J 5/005 307/104 |

* cited by examiner

SYSTEM AND METHOD FOR INCREASING OPERATIONAL RANGE OF INDUCTIVE POWER TRANSMISSION

CROSS-REFERENCE TO RELATED APPLICATIONS

This application is a U.S. National Phase Patent Application under 35 U.S.C. §371 of International Application No. PCT/IL2014/050847, which has an international filing date of Sep. 23, 2014, and which claims priority from and the benefit of the filing date of U.S. Provisional Patent Application Ser. No. 61/881,459, filed Sep. 24, 2013, the full contents and disclosure of which are incorporated herein by reference in their entirety.

FIELD OF THE INVENTION

The present disclosure relates to providing efficient operational wireless power transfer. More specifically, the present invention relates to systems and methods for providing power wirelessly extended operational ranges.

BACKGROUND OF THE INVENTION

The spread of mobile devices such as mobile handsets, media players, tablet computers and laptops/notebooks/netbooks and ultra-books increases user demand for access to wireless power points at which they may transfer power to charge mobile devices while out and about or on the move.

Wireless power transfer systems supporting such requirements are known, such as the system described in United States Patent Application 2012/0193993 A1, to Azancot "ENERGY EFFICIENT INDUCTIVE POWER TRANSMISSION SYSTEM AND METHOD", which is incorporated herein by reference. The system includes an inductive power transmitter and an inductive power receiver, which are provided to form an inductive couple allowing energy to be transferred from a power supply to an electric load associated with an electronic device without a wired connection therebetween. The inductive power transmitter may further adjust the amount of energy being transmitted to the power receiver and respond to communication signals from the inductive power receiver which is aligned thereto.

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductive coil placed close to the primary inductive coil. In this way, electrical energy may be transmitted from the primary inductive coil to the secondary inductive coil by electromagnetic induction without a conductive connection between the inductors.

When electrical energy is transferred from a primary inductive coil to a secondary inductive, the inductors are said to be inductively coupled. An electric load wired in series with such a secondary inductive coil may draw energy from the power source wired to the primary inductive coil when the secondary inductive coil is inductively coupled thereto.

The strength of the induced voltage in the secondary inductive coil varies according to the oscillating frequency of the electrical potential provided to the primary inductive coil. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

There is a need for an energy efficient inductive power transfer system which may extend the operational range of an inductive power outlet when the inductive power receiver is not exactly aligned thereto. The current disclosure addresses this need.

SUMMARY OF THE INVENTION

Inductive power transmitters may comprise at least one primary inductive coil wired to a power supply, forming an inductive couple with at least one secondary inductive coil associated with the inductive power receiver, and at least one driver configured to provide an oscillating voltage across the primary inductive coil. The inductive power receivers operable to provide power to an electric load may comprise at least one secondary inductive coil and an output regulator operable to monitor induced voltage across the secondary inductive coil. An output regulator may further be provided which may be operable to detect an activation voltage pulse, compare the induced voltage with at least one threshold value and send control signals to the inductive power transmitter via the signal transfer system.

The signal transfer system may provide a communication channel used to communicate signals between the inductive power receiver and the inductive power transmitter for real time power regulation. It is noted that the signal transfer system may be used concurrently with inductive transfer of power from the primary inductive coil to the secondary inductive coil.

Various control signals may be used to regulate power from the power transmitter. Optionally, instruction signals may be provided such as described in United States Patent Application 2012/0193993 A1, for example, in which an inductive power receiver may transmit peak pulses with each signal having characteristic frequencies, including a perpetuation signal, a power increase signal, a power decrease signal, a termination signal and the like.

It is noted that the power increase instruction signal is of particular relevance for the current disclosure. Where appropriate, when the inductive power receiver requires more energy, a power increase signal will indicate to the inductive power transmitter that there is a need to increase the power level of the transmitted energy.

It is further noted that various safety mechanisms exist, to prevent damage to the transmitter, receiver or the environment. One such safety mechanism aiming to prevent harmful functionality of the power outlet may be triggered when the inductive power outlet receives a series of consecutive power increase signals from the inductive power receiver over a period longer than a pre-configured maximum value or while it operates in its maximal energy transfer operational point. Such a scenario may occur when the inductive power outlet cannot provide sufficient amount of power to the inductive power receiver during the power transfer phase, possibly due to coil to coil misalignment or mismatch in the power requirements of the inductive power receiver and inductive power outlet. Accordingly, the inductive power outlet may terminate the power transfer and may change state to standby or the like depending upon device configuration.

Additionally or alternatively, the safety mechanism may count the number of consecutive signals in a series and compare the counted value with a pre-configured threshold counting value. Then the system may terminate power transfer if the counted number exceeds the threshold value.

Optionally, measuring duration or counting the consecutive signals in a series may refer to power increase and perpetuation signals.

It is further noted that adjustment of the amount of transmitted energy may be controlled using frequency adjustment, while operating at a transmission frequency above the resonant frequency. Thus, if the power receiver requires more energy it may operate a power increase signal may be transmitted, for example by providing peak pulses having a characteristic frequency of say, 8 kilohertz. Accordingly, the inductive power transmitter will decrease the operating frequency, resulting in a higher amount of transmitted energy.

Accordingly, an inductive power receiver may be configured to request more energy by transmitting power-increase (P-UP) instruction signals, when the rectified voltage drops below a threshold value. The rectified voltage may be subject to changes depending on the operating point determined by the inductive power transmitter, by the electrical load connected to the output of the inductive power receiver and the like.

Some receivers may be operable to limit the output current, for example, using a current limiter, thus reducing the drop of the rectified voltage. Further, the amount of possible transmitted energy from an inductive power transmitter to an inductive power receiver may depend on various conditions. Specifically power transmitted may depend upon the lateral alignment between the center of the receiving coil relative to the center of the transmitting coil. Such misalignment may result in only partial power transmission to the power receiver. This may effect efficiency as well as operational range of transmitter.

In order to prevent potentially harmful power transmission, a possible safety mechanism, such as the "Over Decrement" mechanism described hereinabove, may be applied in the inductive power outlet such that when the power outlet operates at its most energetic operational point power of transmission may be terminated automatically after a series of consecutive power-increase signals are received for longer than a pre-defined period of time or above a pre-defined counter value. Thus, for example, in a frequency regulated inductive power outlet transmitting at a driving frequency above the resonant frequency, when operating at the lowest allowed frequency of the power outlet, if the power outlet receives a consecutive series of power increase signals for a period longer than, say, 120 milliseconds, the power transmission may be terminated.

It is one aim of the invention to provide a power regulator for an inductive power receiver configured to provide energy to an electric load, the inductive power receiver comprising: at least one secondary inductive coil for forming an inductive couple with at least one primary inductive coil of an inductive power outlet; and a signal transmitter operable to send power control signals to the inductive power outlet, the power regulator comprising:
at least one power monitor operable to monitor power received by the electric load; and at least one controller in communication with said power monitor and said signal transmitter, the controller operable to instruct the signal transmitter to transmit a power-increase signal if the power received by the electric load is below a minimum power-threshold;
wherein the power regulator further comprises:
a receiver-side signal-timer operable to measure duration of a series of consecutive power-increase signals; and at least one time-triggered current limiter operable to limit the current required by the electric load thereby reducing the minimum power-threshold, the time-triggered current limiter in communication with the receiver-side signal-timer and configured to activate if the duration of the series of consecutive power-increase signals exceeds a maximum time-threshold.

As appropriate, the series of consecutive power-increase signals further comprises a combination of power increase signals and perpetuation signals.

As appropriate, the maximum time-threshold is smaller than a transmitter safety disconnection time.

Where appropriate, the inductive power outlet further comprising an outlet-side signal-timer operable to measure outlet-side duration of a series of consecutive power increase signals received from said signal transmitter, and the inductive power outlet operable to terminate operation if the outlet-side duration exceeds said transmitter safety disconnection time.

Where appropriate, the signal transmitter comprises a signal transmission circuit comprising at least one electrical element selectively connectable to the secondary inductor by a switching unit, wherein the switching unit is configured to connect the electrical element to the secondary inductor with a characteristic frequency thereby producing a pulse of detectable peaks in primary voltage or primary current having the characteristic frequency. Further, the characteristic frequency of said power-increase signal is about 8 kilohertz.

As appropriate, the signal transmitter comprises a signal transmission circuit comprising at least one electrical element selectively connectable to the secondary inductor by a switching unit, wherein the switching unit is configured to connect the electrical element to the secondary inductor according to a differential bi-phase encoding scheme modulating data bits. Further, the power-increase signal comprises a data byte comprising a start bit, 8 data bits, a parity bit, and a single stop bit, and the data byte comprises a signed integer value providing a control error packet.

Another aspect of the invention teaches a method for regulating power received by an electric load from at least one inductive power outlet via an inductive power receiver, the inductive power receiver comprising:
at least one secondary inductive coil for forming an inductive couple with at least one primary inductive coil associated with the at least one inductive power outlet; and a power regulator operable to monitor power received by the electric load and to instruct a signal transmitter to transmit a power-increase signal to the at least one inductive power outlet if the power received by the electric load is below a minimum power-threshold;
the method comprising: measuring a duration of a series of consecutive power-increase signals; comparing the duration of the series of consecutive power-increase signals with a maximum threshold; and limiting the current required by the electric load if the duration of the series of consecutive power-increase signals exceeds the maximum threshold thereby reducing said minimum power-threshold.

The method further comprising monitoring power received by the electric load. The monitoring power received step comprises comparing power received to the minimum power-threshold and further comprises comparing power received to a maximum power-threshold.

Where appropriate, the method further comprising transmitting control signals to regulate the power received by the electric load.

Where appropriate, the method wherein the step of measuring the duration of the series of consecutive power-increase signals comprises: starting a receiver-side signal-timer when a first of a series of power-increase signals is transmitted; and resetting the receiver-side signal-timer whenever any other control signal is transmitted.

Further, the control signals are selected from at least one of: a power-increase signal transmitted if the power received by the electric load is below a minimum power-threshold; a power-decrease signal transmitted if the power received by the electric load is above a maximum power-threshold; a perpetuation signal transmitted if the power received by the electric load is above the minimum power-threshold and below the maximum power-threshold.

Where appropriate, measuring the duration of the series of consecutive power-increase signals comprises: starting a receiver-side signal-timer when a first of a series of power-increase signals is transmitted; and resetting said receiver-side signal-timer whenever a power-decrease signal is transmitted.

Where appropriate, measuring the duration of the series of consecutive power-increase signals comprises: starting a receiver-side signal-timer when the power received by the electric load drops below a minimum power-threshold; and resetting said receiver-side signal-timer when the power received by the electric load rises above the minimum power-threshold.

Where appropriate, for limiting the current the step comprises: activating a time-triggered current limiter.

As appropriate, the signal transmitter comprises a signal transmission circuit comprising at least one electrical element selectively connectable to the secondary inductor by a switching unit, wherein the switching unit is configured to connect the electrical element to the secondary inductor with a characteristic frequency thereby producing a pulse of detectable peaks in primary voltage or primary current having the characteristic frequency. Further, the characteristic frequency of the power-increase signal is about 8 kilohertz.

The signal transmitter comprises a signal transmission circuit comprising at least one electrical element selectively connectable to the secondary inductor by a switching unit, wherein the switching unit is configured to connect the electrical element to the secondary inductor according to a differential bi-phase encoding scheme modulating data bits.

As appropriate, the power-increase signal comprises a data byte comprising a start bit, 8 data bits, a parity bit, and a single stop bit where the data byte comprises a signed integer value providing a control error packet.

A power regulator for an inductive power receiver configured to provide energy to an electric load, the inductive power receiver comprising: at least one secondary inductive coil for forming an inductive couple with at least one primary inductive coil of an inductive power outlet; and a signal transmitter operable to send power control signals to said inductive power outlet, the power regulator comprising:
at least one power monitor operable to monitor power received by the electric load; and at least one controller in communication with said power monitor and the signal transmitter, said controller operable to instruct said signal transmitter to transmit a power-increase signal if the power received by the electric load is below a minimum power-threshold;

wherein said power regulator further comprises: a receiver-side signal-counter operable to count a total-number of a series of consecutive power-increase signals; and at least one count-triggered current limiter operable to limit the current required by the electric load thereby reducing said minimum power-threshold, the count-triggered current limiter in communication with the receiver-side signal-counter and configured to activate if the total-number of the series of consecutive power-increase signals exceeds a maximum count-threshold.

As appropriate, the series of consecutive power-increase signals further comprises a combination of power increase signals and perpetuation signals;

As appropriate, the maximum count-threshold is smaller than a transmitter safety disconnection count.

As appropriate, inductive power outlet further comprising an outlet-side signal-counter operable to count outlet-side total-number of a series of consecutive power increase signals received from said signal transmitter, the inductive power outlet operable to terminate operation if the outlet-side total-count exceeds the transmitter safety disconnection count.

As appropriate, the signal transmitter comprises a signal transmission circuit comprising at least one electrical element selectively connectable to the secondary inductor by a switching unit, wherein the switching unit is configured to connect the electrical element to the secondary inductor with a characteristic frequency thereby producing a pulse of detectable peaks in primary voltage or primary current having the characteristic frequency. Further, the characteristic frequency of said power-increase signal is about 8 kilohertz.

As appropriate, the signal transmitter comprises a signal transmission circuit comprising at least one electrical element selectively connectable to the secondary inductor by a switching unit, wherein the switching unit is configured to connect the electrical element to the secondary inductor according to a differential bi-phase encoding scheme modulating data bits.

As appropriate, the power-increase signal comprises a data byte comprising a start bit, 8 data bits, a parity bit, and a single stop bit, and the data byte comprises a signed integer value providing a control error packet.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION

Aspects of the present invention relate to providing systems and methods for controlling efficient wireless power transfer. More specifically, the present invention relates to incorporating a current limiter activation mechanism into a wireless power receiver so as to enable power transfer at an extended range when an inductive power transmitter and an inductive power receiver are laterally displaced.

Various protective measures for safety purposes, may be applied when an inductive power outlet operates at its highest operational power level. For example, if the power outlet receives a consecutive series of power increase signals (P-UP) from the inductive power receiver for a duration exceeding a pre-configured transmitter-side maximum time limit, say 120 milliseconds or so, the inductive power transmitter may terminate the power transfer. Such a transmitter-side safety protocol may be applied to prevent damage or malfunctioning of the transmitter.

Additionally or alternatively, the transmitter-side safety protocol may be applied if the power outlet receives more than a total number of consecutive power increase signals in a series from the inductive power receiver exceeding a pre-configured transmitter-side maximum count-value, say 24 consecutive power increase signals or 180 consecutive power increase signals or the like, the inductive power transmitter may terminate the power transfer.

Optionally, measuring duration or counting consecutive signals in a series may be selected from a group consisting of a power increase and a perpetuation signal.

The transmitter-side safety protocol described above has been found to limit the range of the power transmitter as a poorly aligned power receiver is likely to receive too little power and therefore to send consecutive power-increase signals for durations longer than the pre-configured transmitter-side maximum time limit Consequently, the transmitter may stop transmitting power when the power receiver is radially displaced.

It has surprisingly been found that the range of the inductive power transmitter may be extended by incorporating a current limiter to the inductive power receiver. Such a current limiter may be activated before the pre-configured transmitter-side maximum time limit and so before the transmitter stops transmitting power. When activated, the current limiter may reduce the amount of power required by the receiver thereby ensuring continuous power transfer at a lower voltage. Accordingly, so long as the electrical device is operable at the lower voltage it may operate over an extended range.

It is particularly noted that the current limiter may have incorporated functionality of activation, such as time-triggered current limiter activation based upon duration measurements of a series of consecutive transmission of power control signals; count-triggered current limiter activation based upon counting a series of consecutive transmission of power control signals and the like.

Figure 1:
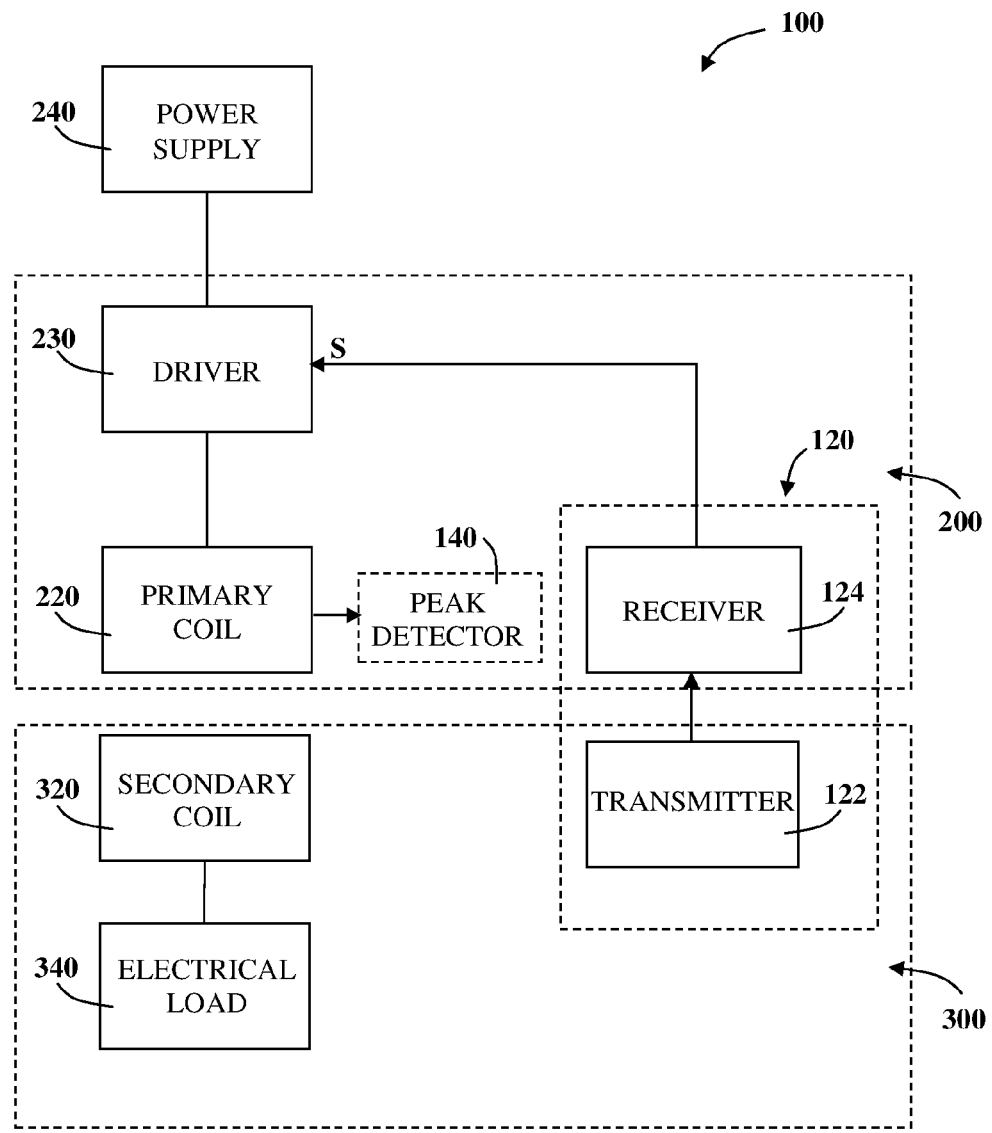
FIG. 1 is a block diagram showing the main elements of an inductive power transfer system with a feedback signal path.

Reference is now made to FIG. 1, showing a block diagram of the main elements of an inductive power transfer system 100 for transmitting power to an electric load 340.

The inductive power transfer system 100 consists of an inductive power outlet 200 configured to provide power to a remote inductive power receiver 300. The inductive power outlet 200 includes a primary inductive coil 220 wired to a power source 240 via a driver 230. The driver 230 is configured to provide an oscillating driving voltage to the primary inductive coil 220.

The inductive power receiver 300 includes a secondary inductive coil 320, wired to an electric load 340, which is inductively coupled to the primary inductive coil 220. The electric load 340 draws power from the power source 240. A communication channel 120 may be provided between a transmitter 122 associated with the inductive power receiver 300 and a receiver 124 associated with the inductive power outlet 200 to communicate the required operating parameters. Variously, the operating parameters transmitted in the form of feedback signals S and the like, may be used to indicate the transmission frequency required by the electric load 340 to the driver 230 to allow controlling inductive power supply.

The feedback transmission may communicate required or monitored operating parameters of the electric load 340 such as:

required operating voltage, current, temperature or power for the electric load 340, the measured voltage, current, temperature or power supplied to the electric load 340 during operation, the measured voltage, current, temperature or power received by the electric load 340 during operation and the like.

It is noted that communications or messages, may be constructed from strings of bits representing bytes of information, such as a byte characterized as a string of 10 bits: a BitST (start), Bit0, Bit1, Bit2, Bit3, Bit4, Bit5, Bit6, Bit7 and BitSP (stop). Such representation, may allow transmissions of various additional communications or messages.

Operational Voltage:

Various methods may be used by the power transmitter to regulate the transmitted power. The power regulation methods include regulating power transfer by adjusting the duty cycle of the transmission voltage, by adjusting the primary current or by adjusting the amplitude of the transmission voltage. According to a particular example, as described in the applicant's co-pending United States Patent Application No. 2012/0193993, a non-resonant transmission frequency may be used to regulate power transfer, by the driver adjusting the transmission frequency.

Figure 2:
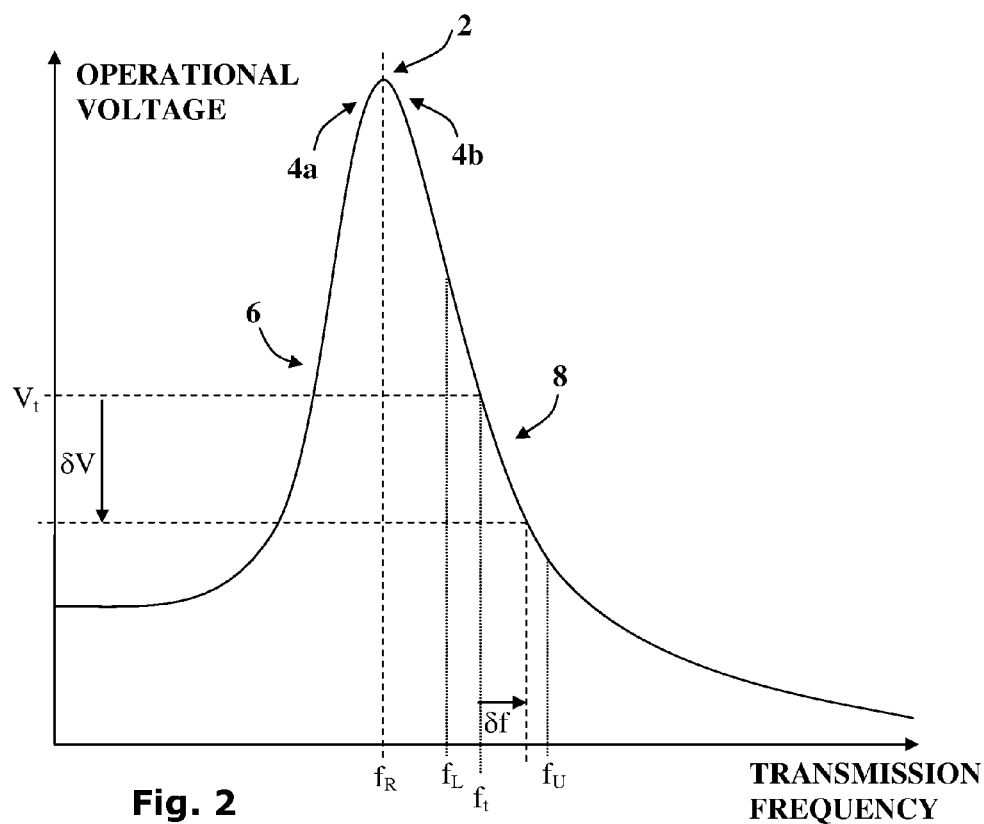
FIG. 2 is a graph showing how the amplitude of operational voltage of an inductive power transfer system varies with transmission frequency.

Reference is now made to FIG. 2, showing a graph of how the amplitude of the operational voltage of an inductive power transfer system varies according to the transmission frequency.

It is noted that the voltage is at its highest when the transmission frequency is equal to the resonant frequency $f_R$ of the system, this maximum amplitude is known as the resonance peak 2.

It is further noted that the slope of the graph is steepest in the regions 4a, 4b to either side of the resonance peak 2. Thus in inductive power transfer systems, which operate at or around resonance, a small variation in frequency results in a large change in induced voltage. Similarly, a small change in the resonant frequency of the system results in a large change in the induced voltage. For this reason, systems using resonant transmission frequency to regulate power transfer are typically very sensitive to small fluctuations in environmental conditions or variations in alignment between the induction coils.

It is also noted that the driver 230 (FIG. 1) is configured and operable to transmit a driving voltage which oscillates at a transmission frequency which is substantially different from the resonant frequency of the inductive couple. Optionally the transmission frequency is selected to lie within one of the near-linear regions 6, 8 where the slope of the frequency-amplitude graph is less steep.

The power regulation is illustrated with reference to the graph of FIG. 2. The frequency of transmission may be selected to be in the approximately linear region 8 of the curve between a lower frequency value of $f_L$ and an upper frequency value of $f_U$. A transmission frequency $f_t$, higher than the resonant frequency $f_R$ of the system, produces an induced voltage of $V_t$. The induced voltage can be increased by reducing the transmission frequency so that it is closer to the resonant frequency $f_R$. Conversely, the induced voltage may be reduced by increasing the transmission frequency so that it is further from the resonant frequency $f_R$. For example, an adjustment of transmission frequency by $\delta f$ produces a change in induced voltage of $\delta V$.

Figure 3:
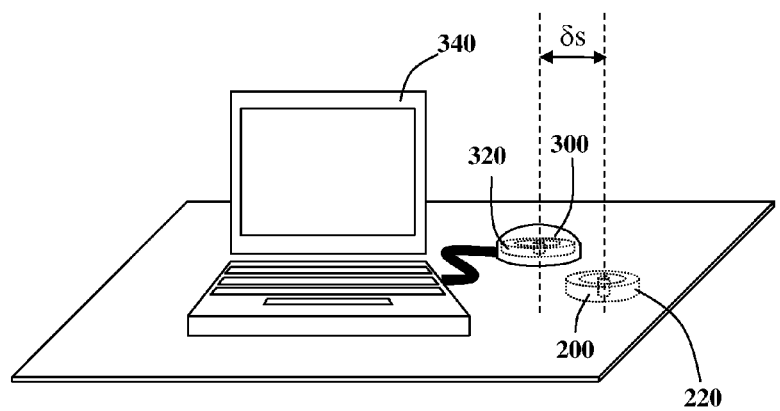
FIG. 3 is a schematic diagram representing a laptop computer drawing power from an inductive power outlet laterally displaced from the inductive power receiver.

Lateral Displacement:

Reference is now made to FIG. 3, showing a schematic diagram representing a laptop computer 340 drawing power from an inductive power outlet 200 via an inductive power receiver 300, laterally displace from the inductive power outlet by $\delta s$.

The inductive power receiver 300 includes a secondary inductive coil 320 which is laterally displaced from a primary inductive coil 220 of the inductive power outlet 200. Any lateral displacement of the inductive power receiver 300 changes the alignment between the secondary inductive coil 320 and the primary inductive coil 220, resulting in changes of the combined inductance of the coil pair which in turn changes the resonant frequency of the system.

Various conditions may cause the inductive power receiver to request power increase, in particular when the rectified voltage drops below a preconfigured threshold value. The rectified voltage may be subject to changes depending on the operating point determined by the inductive power transmitter and also by the electrical load connected to the output of the inductive power receiver (such as described in FIG. 4A, hereinafter).

It may be noted that the energy drawn by an inductive power receiver from an inductive power outlet may depend amongst other things, on the lateral alignment between the centers of the receiving inductive coil relative to the center of the transmitting inductive coil. For example, if the power limit is set by the electrical current intensity allowed from an inductive power outlet, then possible power drawn is of 5[W]=(5[V]1 [A]) from the inductive power receiver when primary and secondary inductive coils are properly aligned. When the primary and secondary inductive coils are placed at some misalignment, the possible drawn power may be limited, for example, 2.5[W]=(5[V]0.5[A]). If an inductive power receiver operating at such misalignment, tries to draw the full 1 [A] current intensity from the inductive power outlet, it is likely to trigger the transmitter-side safety mechanism, as described hereinabove. Accordingly, if the power receiver operates at the same misalignment, but attempts to draw only 0.5[A], it might still fall within the acceptable limits of the power outlet, thus providing the desired functionality at an extended operational range without triggering the transmitter side safety mechanism.

Accordingly, the range of the inductive power transmitter may be extended by incorporating a current limiter to the inductive power receiver. Such a current limiter may be activated before the pre-configured transmitter-side maximum time limit and so before the transmitter stops transmitting power. When activated, the current limiter may reduce the amount of power required by the receiver thereby ensuring continuous power transfer at a lower voltage. Accordingly, so long as the electrical device is operable at the lower voltage it may operate over an extended range.

Where appropriate, the inductive power receiver is operable to monitor the time duration of consecutive power increase control signals, using possibly a transmitter-side signal timer (such as described in FIG. 4B, hereinafter). Thus, if the inductive power receiver monitors that the relevant modulation (for example, 8 kilohertz), is not sufficient, due to low rectified voltage while energy transmitted to the power receiver, within a pre-configured time duration limit (say 50 milliseconds), smaller than the threshold time value (say 120 milliseconds), it may apply the current limiter such that the drop of the rectified voltage at the given misalignment is reduced to allow the inductive power receiver to continue receiving power at a reduced power and preventing the transmitter terminating power transfer at pre-configured transmitter-side maximum time limit.

It is further noted that if the inductive power outlet 200 transmits power at the resonant frequency of the system, even a small lateral movement would reduce significantly the amplitude of the induced voltage. In contradistinction to the other systems, in embodiments associated with the present invention the inductive power outlet 200 transmits power at a frequency in one of the regions 6, 8 to either side of the resonance peak 2 (FIG. 2) where the slope of the resonance graph is much shallower. Consequently, the system has a much larger tolerance of variations such as lateral movement.

A further feature of embodiments of inductive power outlets transmitting at frequencies above the natural resonant frequency of the system, is that if the resonant frequency of the system increases for some reasons, then the transmission voltage increases sharply. In preferred embodiments, a peak detector 140 (FIG. 1) is be provided to monitor the transmission voltage of the power outlet 200 and is configured to detect large increases in the transmission voltage indicating an increase in resonant frequency.

Figure 4A:
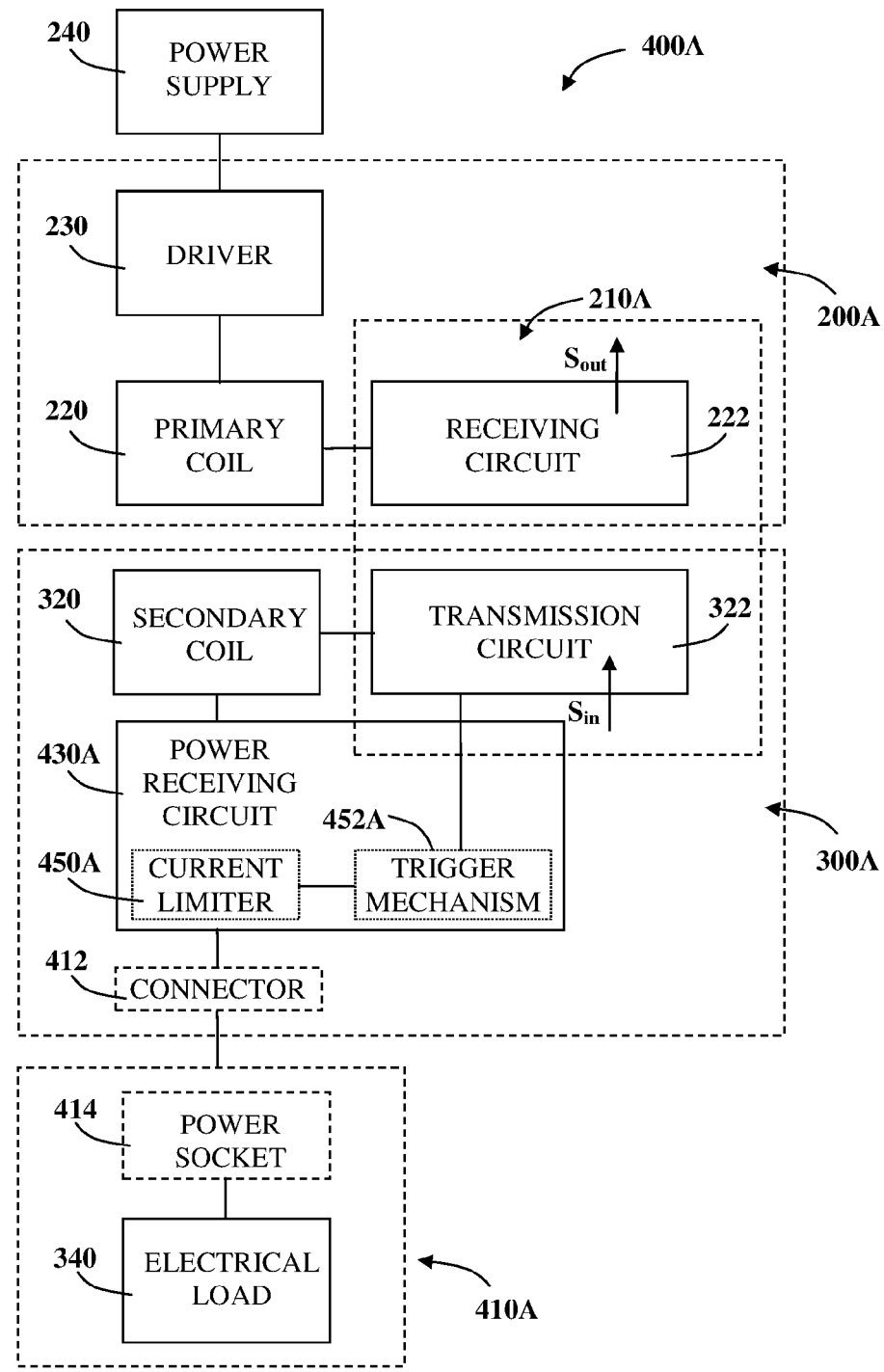
FIG. 4A is a block diagram representing selected elements of an energy efficient inductive power transfer system with a current limiter according to an embodiment of the present invention.

Power Limit Embodiment—(I):

Reference is now made to the block diagram of FIG. 4A, representing selected elements of an embodiment of an energy efficient inductive power transfer system 400A possibly configured to transmit power at a resonant/non-resonant frequency and controlled via a power limiter according to one embodiment of the current disclosure. The inductive power transfer system 400A includes an inductive power outlet 200A and an inductive power receiver 300A and may be used to provide wireless power from a power supply to an electrical device.

The inductive power outlet 200A includes a primary inductive coil 220 wired to a power source 240 via a driver 230. The driver 230 may be configured to provide an oscillating driving voltage to the primary inductive coil 220, typically at a voltage applicable to the transmission frequency $f_t$ (FIG. 2) which is higher than the resonant frequency $f_R$ (FIG. 2) of the system.

The inductive power receiver 300A includes a secondary inductive coil 320, which is inductively coupled to the primary inductive coil 220, a power receiving circuit 430A wired to a current limiter 450A and a trigger mechanism 452A.

The secondary inductive coil 320 may be wired to an electrical load 340. Optionally, the secondary inductive coil 320 may be connected via a connector 412 connectable to a power socket 414 of the electrical device 410A. The secondary inductive coil 320 may be configured such that, when placed in the oscillating magnetic field of the active primary inductive coil 220, a secondary voltage is induced across the secondary inductive coil 320.

The current limiter 450A is operable to limit output current where required and may further be configured to control inductive power transfer when misalignment occurs. Particularly, the current limiter may provide extended range of operation at a lower power, as long as the device is capable of tolerating the limitations. The trigger mechanism 452 may configured to activate the current limiter 450A when a condition is fulfilled. For example, the trigger mechanism 452A may comprise a timer in communication with the signal transfer system 210A and operable to measure the duration of a series of control signals. Alternatively, or additionally, the trigger mechanism 452A may comprise a counter operable to count the number of control signals transmitted. Still other trigger mechanisms 452A will occur to those skilled in the art.

The inductive power transfer system 400A may further include a signal transfer system 210A. The signal transfer system 210A includes a transmission circuit 222 associated with the secondary inductive coil 320 and a receiving circuit 222 associated with the primary inductive coil 220 configured to detect instruction signals transmitted from the inductive power receiver 300A.

It is noted that the signal transfer system 210A may be configured to produce an output signal $S_{out}$ in the power outlet 200A when an input signal $S_{in}$ is provided by the inductive power receiver 300A without interrupting the inductive power transfer from the inductive power outlet 200A to the inductive power receiver 300A.

It is particularly noted that the current limiter 450A of the current disclosure may be operable to limit the input current for such devices to a predefined level or to a value within a required range. Such current limiting may provide power transfer functionality of lower power rate at an extended operational range, based upon electrical device limitations and may further reduce heat dissipation and instability of the devices.

Figure 4B:
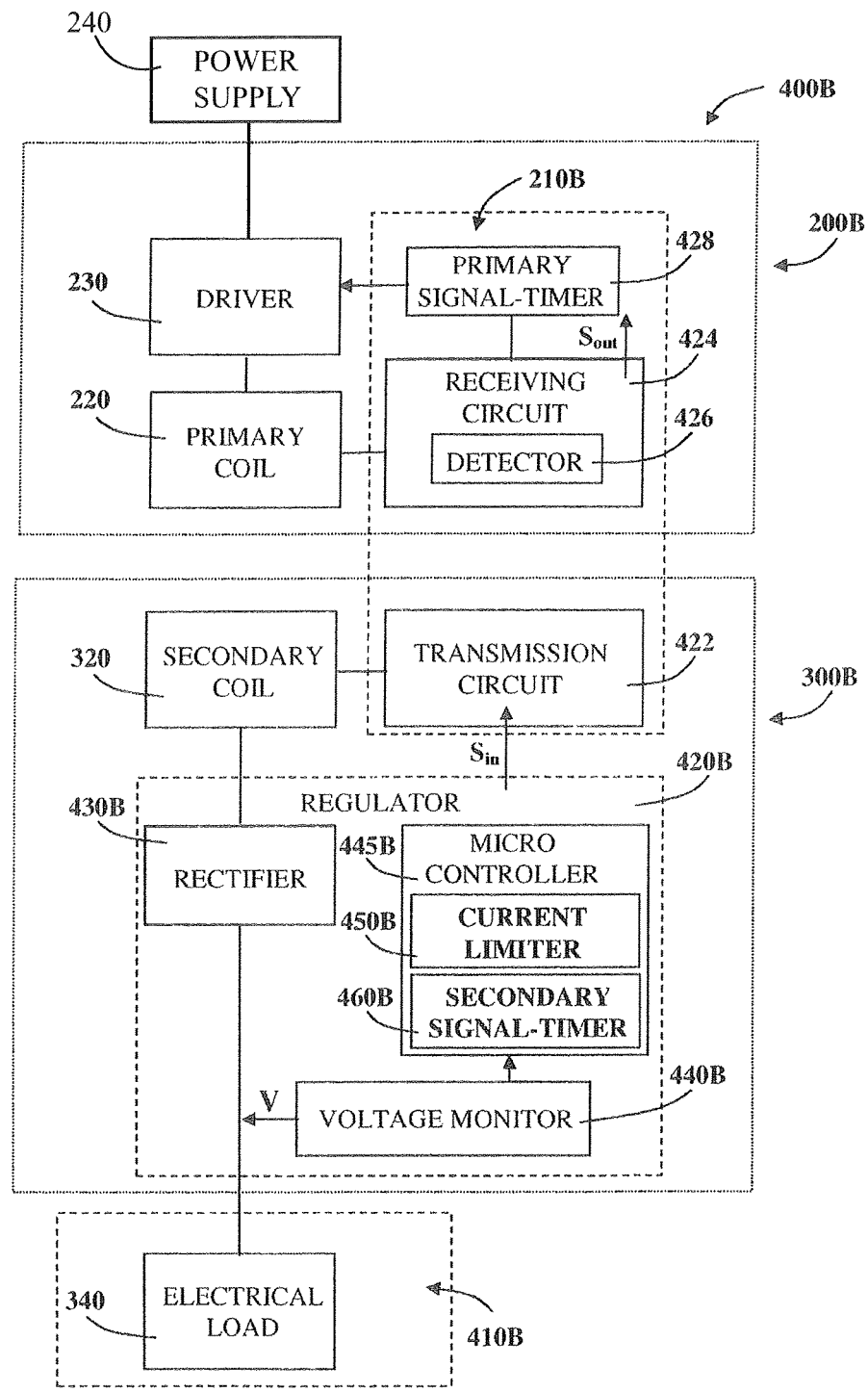
FIG. 4B is a block diagram representing selected elements of an energy efficient inductive power transfer system with a current limiter according to another embodiment of the present invention.

Power Limit Embodiment—(II):

Reference is now made to block diagram of FIG. 4B, representing the selected elements of an energy efficient inductive power transfer system 400B, possibly configured to transmit power at a resonant/non-resonant frequency and controlled via a power limiter according to another embodiment of the current disclosure. The inductive power transfer system 400B includes an inductive power outlet 200B and an inductive power receiver 300B, where the power outlet 200B may be used to provide wireless power from a power supply to an electrical device.

The inductive power outlet 200B includes a primary inductive coil 220 wired to a power source 240 via a driver 230 and a primary signal-timer 428. The driver 230 may be configured to provide an oscillating driving voltage to the primary inductive coil 220, typically at a voltage applicable to the transmission frequency $f_t$ (FIG. 2) which is higher than the resonant frequency $f_R$ (FIG. 2) of the system. The primary signal-timer 428 may be configured to measure time elapsed of receiving power increase control signals from the inductive power receiver to allow safety measures, such as instructing the driver 230 to cease power transfer, if the measured time elapse exceeds pre-configured threshold time value. Additionally or alternatively, the inductive power outlet 200B may include a signal-counter configured to count the number of consecutive power increase signals in a series, as described hereinafter.

The inductive power receiver 300B includes a secondary inductive coil 320, which is inductively coupled to the primary inductive coil 220 and a regulator 420B. The regulator 420B further includes a rectifier 430B, a voltage monitor 440B and a micro-controller 445B wired to a current limiter 450B. The current limiter 450B may be operable to limit output current for safety measures and may further be configured to control inductive power transfer when misalignment occurs. Further, a secondary signal-timer 460B may be configured to measure time elapse of subsequent power increase control signals for comparing measured time with pre-configured threshold values. In particular, the current limiter 450B incorporated into the inductive power receiver 300B may provide extended range of operation at a lower power, as long as the device is capable of tolerating the limitations. The secondary inductive coil 320 may be wired to an electrical load 340 of an electrical device 410B.

As appropriate, the secondary inductive coil 320 may be configured such that, when placed in the oscillating magnetic field of the active primary inductive coil 220, a secondary voltage is induced across the secondary inductive coil 320. Further, the regulator 420B may be operable to monitor induced secondary voltage across the secondary inductive coil 320 and to compare the induced voltage with reference values. By comparing the secondary voltage with threshold values, the regulator 420B may determine whether the secondary voltage lies within a permissible range of values. Accordingly, instruction signals may be selected by the regulator 420B and generated by the transmission circuit 422 instructing the inductive power outlet 200B to adjust the induced voltage across the secondary inductive coil 320.

It may be noted that a rectifier 430B may be necessary, for example, where the electrical load 340 comprises an electrochemical cell to be charged.

The inductive power transfer system 400B may further comprise a signal transfer system 210B for transferring signals between the inductive power outlet 200B and the inductive power receiver 300B. The signal transfer system 210B incorporated into the inductive power transfer system 400B may include a transmission circuit 422 associated with the secondary inductive coil 320 and a receiving circuit 424 associated with the primary inductive coil 220 configured to detect instruction signals via a detector 426, transmitted from the inductive power receiver 300B.

It may be appreciated that the inductive power transfer system 400B is used to provide wireless power from a power supply to an electrical device. Where appropriate, during the power transfer phase, the inductive power outlet may regulate its delivered power by adjusting the operation frequency according to the inductive power receiver requests. Additionally, the inductive power outlet may be configured to use a fast first-order tracking algorithm (FFOT) to control its operational frequency according to control signals provided continuously by the inductive power receiver, such as increase, decrease or no change of operational frequency in order to meet the electric device required power. In other systems, the power level may be regulated by adjusted the duty cycle of the primary voltage, the amplitude of the primary current or the primary voltage or the like.

Additionally or alternatively, the inductive power receiver 300B may include a signal-counter operable to count a series of consecutive control signals. Thus, the safety mechanism may be triggered upon an indicator based upon measurement of a series of consecutive signal transmission duration or by counting the number of consecutive control signals in a series, wherein the signals may be power increase signals only or a combination of power increase signals and perpetuation signals.

For example, transmission of a maximum of 24 consecutive power increase signals may be sufficient to move the transmitter to its minimum operational frequency (maximal power transfer) no matter what the starting frequency was (a transmitter can be controlled to move from minimal power (maximum frequency) operation point to maximal power (minimal frequency) operation point within, say 3 milli-seconds). Similarly, transmission of 180 consecutive power decrease signals may be sufficient to move the transmitter to its maximal operational frequency (minimal power transfer) no matter what the starting frequency was (the transmitter can be controlled to move from maximal power (minimal frequency) operation point to minimal power (maximum frequency) operation point within 180 milli-seconds).

Figure 4C:
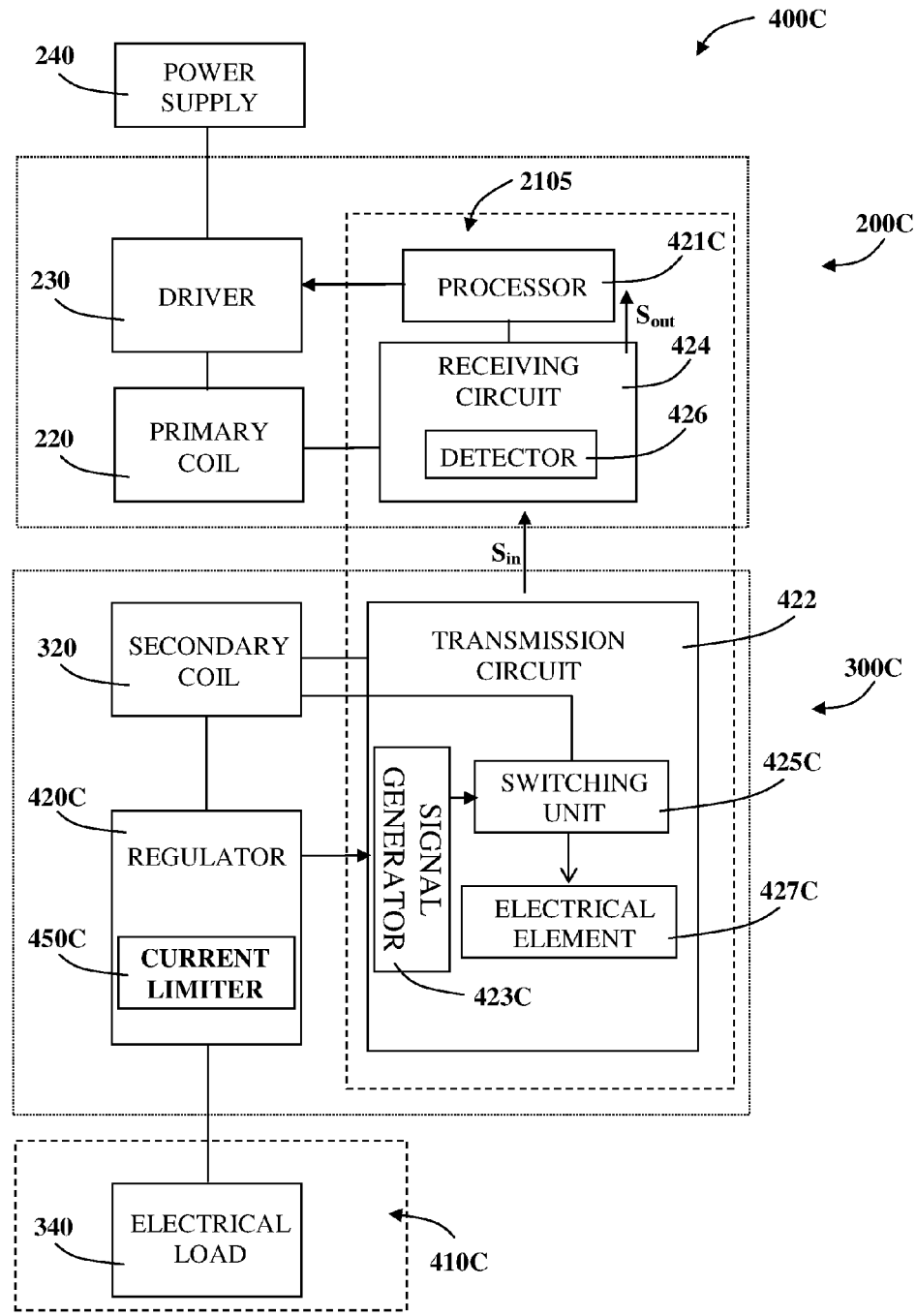
FIG. 4C is a block diagram representing selected elements of an energy efficient inductive power transfer system with an electrical element according to yet another embodiment of the present invention.

Power Limit Embodiment—(III):

Reference is now made to the block diagram of FIG. 4C representing selected components of another possible embodiment of an energy efficient inductive power transfer system 400C. The inductive power transfer system 400C includes an inductive power outlet 200C and an inductive power receiver 300C and is configured to switch between transmission mode and standby mode.

The signal transfer system 210C of the inductive power transfer system 400C, may be configured for transferring signals between the inductive power outlet 200C and the inductive power receiver 300C includes a transmission circuit 422 associated with the secondary inductive coil 320 operable to generate the at least one instruction signal by a signal generator 423, and a receiving circuit 424 associated with the primary inductive coil 220 configured to detect instruction signals by a detector 426, transmitted from the inductive power receiver 300C. The transmission circuit further comprises an electrical element 427C such as a capacitor, resistor or the like selectively connectable to the secondary inductive coil 320 by a switching unit 425C to modulate the power signal. The electrical element 427C is selected such that by connecting and disconnecting the element to the secondary inductive coil 320, two modulation states are generated, a Mod state and a NoMod state. Transition between these two states may lead to a detectable change in the primary inductive coil current and/or primary inductive coil voltage. The switching unit 425C may be configured to connect the electrical element to the secondary inductive coil 220 with a characteristic frequency thereby producing a pulse of detectable peaks in primary voltage or primary current having the characteristic frequency.

It is noted that in standby mode the system 400C may be dormant with the inductive power outlet 200C and inductive power receiver 300C waiting for an activation signal before transitioning to transmission mode. In transmission mode, the inductive power system 400C is configured and operable to draw power from a power supply 240, such as a mains electricity supply, a vehicle battery, a power generator, fuel cell or the like, to an electric load 340.

It will be appreciated, that such an inductive power transfer system 400C may significantly reduce power losses associated with prior art power transfer systems. During the standby mode little or no power may be drawn from the power supply 240. The inductive power outlet 200C may be configured to switch to transmission mode only in the presence of a suitable inductive power receiver 300C. Furthermore, the system 400C may be operable to revert to standby mode when no power need be transferred, for example when the inductive power receiver 300C is removed or the electric load 340 requires no further power. Thus power is only drawn by the system 300C when actually required.

Accordingly, the regulator 420C of the inductive power receiver 300C includes a current limiter 450C operable to limit output current where required and further configured to control inductive power transfer when misalignment occurs and may further include a controller, rectifier, capacitors, microcontroller, voltage monitor or the like (not shown), and is in communication with the transmission circuit 422.

It is noted that the switching unit 425C may be configured to connect the electrical element 427C to the secondary inductive coil 320 with a characteristic frequency thereby producing a pulse of detectable peaks in primary voltage or primary current having the characteristic frequency. Optionally, the characteristic frequency of the power increase signal is about 8 kilohertz. Alternatively, the switching unit 425C is configured to connect the electrical element 427C to the secondary inductive coil 320 according to a differential bi-phase encoding scheme modulating data bits, as detailed in FIG. 5A.

Figure 5A:
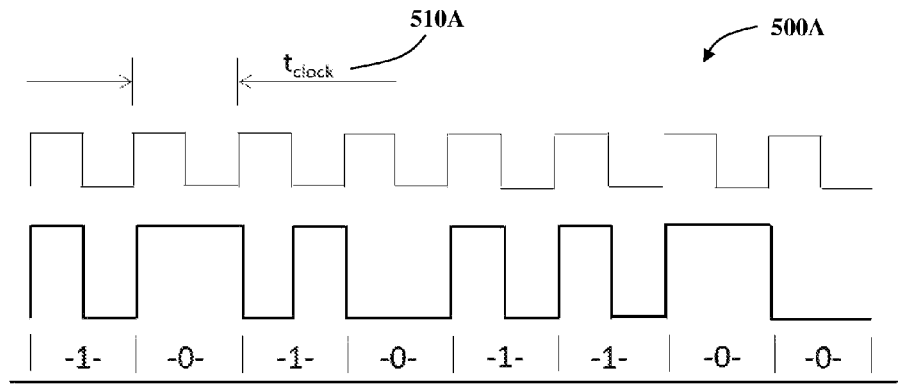
FIG. 5A is an example representing differential bi-phase encoding scheme for modulating data bits.
Figure 5B:
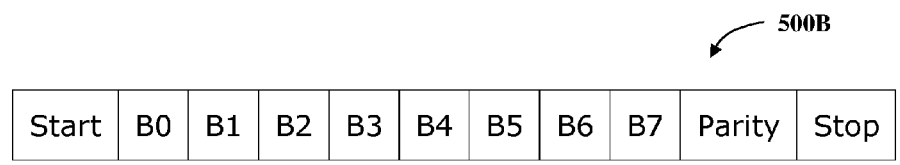
FIG. 5B is an example representing a byte scheme encoding of 11 bit asynchronous serial format to transmit data bytes by the inductive power receiver.
Figure 5C:
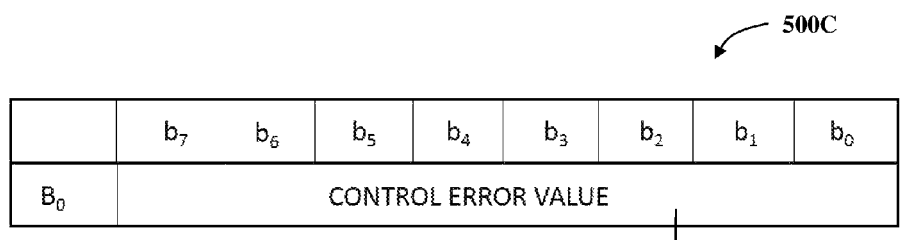
FIG. 5C is an example representing a control error packet structure provided by the data byte as shown in FIG. 5B.

It is further noted that the power increase signal may comprise a data byte comprising a start bit, 8 data bits, a parity bit, and a single stop bit as described in FIG. 5B, where the data byte may comprise a signed integer value providing a control error packet, as detailed in FIG. 5C.

Reference is now made to FIG. 5A, showing an example representing differential bi-phase encoding scheme 500A for modulating data bits.

The differential bi-phase encoding scheme 500A may be used by the inductive power receiver to modulate data bits onto the power signal. For this purpose the inductive power receiver needs to align each data bit to a full period of the $t_{CLOCK}$ 510A of an internal clock signal, such that the start of a data bit coincides with the rising edge of the clock signal.

As shown in the example of FIG. 5A, the inductive power receiver may encode a ONE bit using two transitions in the power signal, such that the first transition coincides with the rising edge of the clock signal, and the second transition coincides with the falling edge of the clock signal. The inductive power receiver may encode a ZERO bit using a single transition in the power signal, which coincides with the rising edge of the clock signal.

Reference is now made to FIG. 5B, showing an example representing a byte scheme encoding 500B of 11 bit asynchronous serial format to transmit data bytes by the inductive power receiver.

The inductive power receiver may use an 11-bit asynchronous serial format to transmit a data byte. This format consists of a start bit, the 8 data bits of the byte, a parity bit, and a single stop bit.

Where appropriate, the start bit is a ZERO, the order of the data bits is least significant bit (1 sb) first and the parity bit is odd. This may imply that the inductive power receiver may set the parity bit to ONE if the data byte contains an even number of ONE bits. Otherwise, the inductive power receiver may set the parity bit to ZERO and the stop bit is a ONE.

Reference is made now to FIG. 5C, showing an example representing a control error packet 500C structure provided by the data byte as described in FIG. 5B.

It is noted that that generally the inductive power receiver communicates with the inductive power outlet using packets with a packet structure comprising four parts: a preamble, a header, a message, and a checksum. In the power transfer phase, the inductive power receiver may control the power transfer from the inductive power outlet, by means of control data transmitted to the inductive power outlet. Thus, for example the unsigned integer 510C contained in this field indicates the average amount of power that the inductive power receiver receives through its interface surface, in the time window indicated in a configuration packet.

Figure 6A:
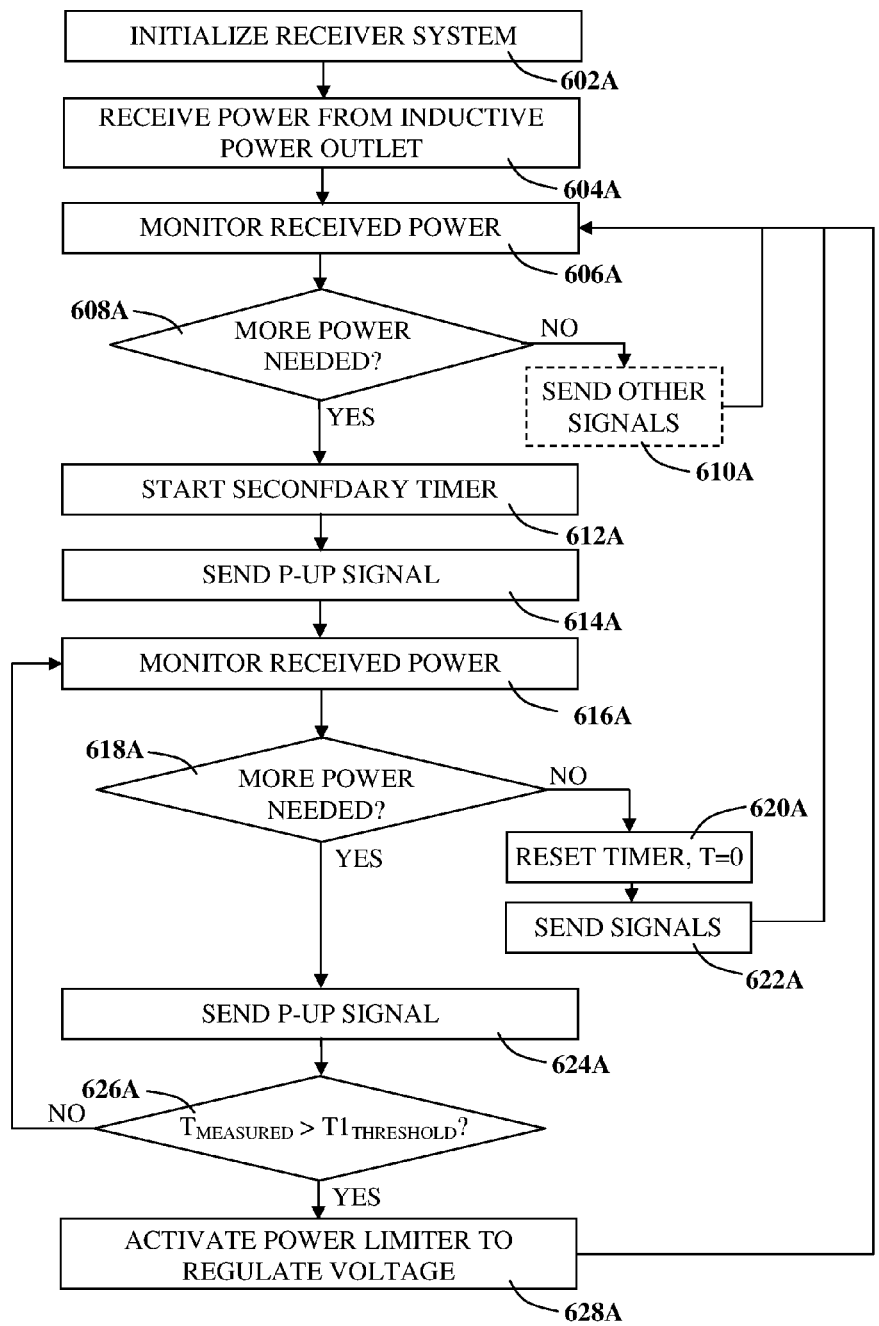
FIG. 6A is a flowchart representing a method for regulating power transfer using a power limiter in an inductive power transfer system according to a further embodiment of the invention.

Power Receiver—Extended Range Operability:

Reference is now made to the flowchart of FIG. 6A, representing selected actions of a method for enabling extended range powering functionality using a current limiter 450A (FIG. 4A) for regulating power transmission of an inductive power receiver of the disclosure.

It is noted that various transmission signals may be used with the system, as described hereinabove, with particular reference to power increase signal (P-UP) which is associated with the activation of the power-limiter, of the current disclosure. Thus, as appropriate, instructions may be sent via the signal transfer system, from the transmission circuit 322 (FIG. 4A) of the inductive power receiver 300A (FIG. 4A) to the receiving circuit 222 (FIG. 4A) of the inductive power outlet 200A (FIG. 4A) to increase power by a certain interval, to decrease power by a certain interval, to maintain the same power, to terminate power transfer or the like. Where no such transmission signals are received, the inductive power outlet 200A (FIG. 4A) may be configured to stop driving the primary inductor 220 (FIG. 4A) and to revert to the standby mode.

The method comprises: initializing inductive power receiver 602A, optionally resetting the secondary timer; receiving power from the inductive power outlet 604A; monitoring the received power 606A; comparing power needed and received power 608A; if no additional power is required, then transmitting, accordingly, the necessary instruction signals 610A; repeating monitoring received power 606A; if more power is needed, then starting the secondary timer 612A; and sending increase power P-UP signal 614A; then, monitoring continually received power 616A; comparing power needed and received power 618A; if no additional power is required, then resetting the secondary timer 620A; transmitting, accordingly, the necessary instruction signals 622A; repeating monitoring received power 606A; if more power is needed, then sending increase power P-UP signal 624A; comparing the elapsed time of successive P-UP transmissions as measured by the secondary timer with a pre-configured threshold time 626A; if elapsed time is greater than the pre-configured threshold time, then activating power-limiter to regulate voltage accordingly, while providing extra operational range at a reduced rectified voltage; otherwise, repeating monitoring received power 616A.

It is specifically noted that the increase of the operational range may come at a cost of amount of power delivered to the electrical load associated with the electrical device, as long as the electrical device tolerates such limitations.

Figure 6B:
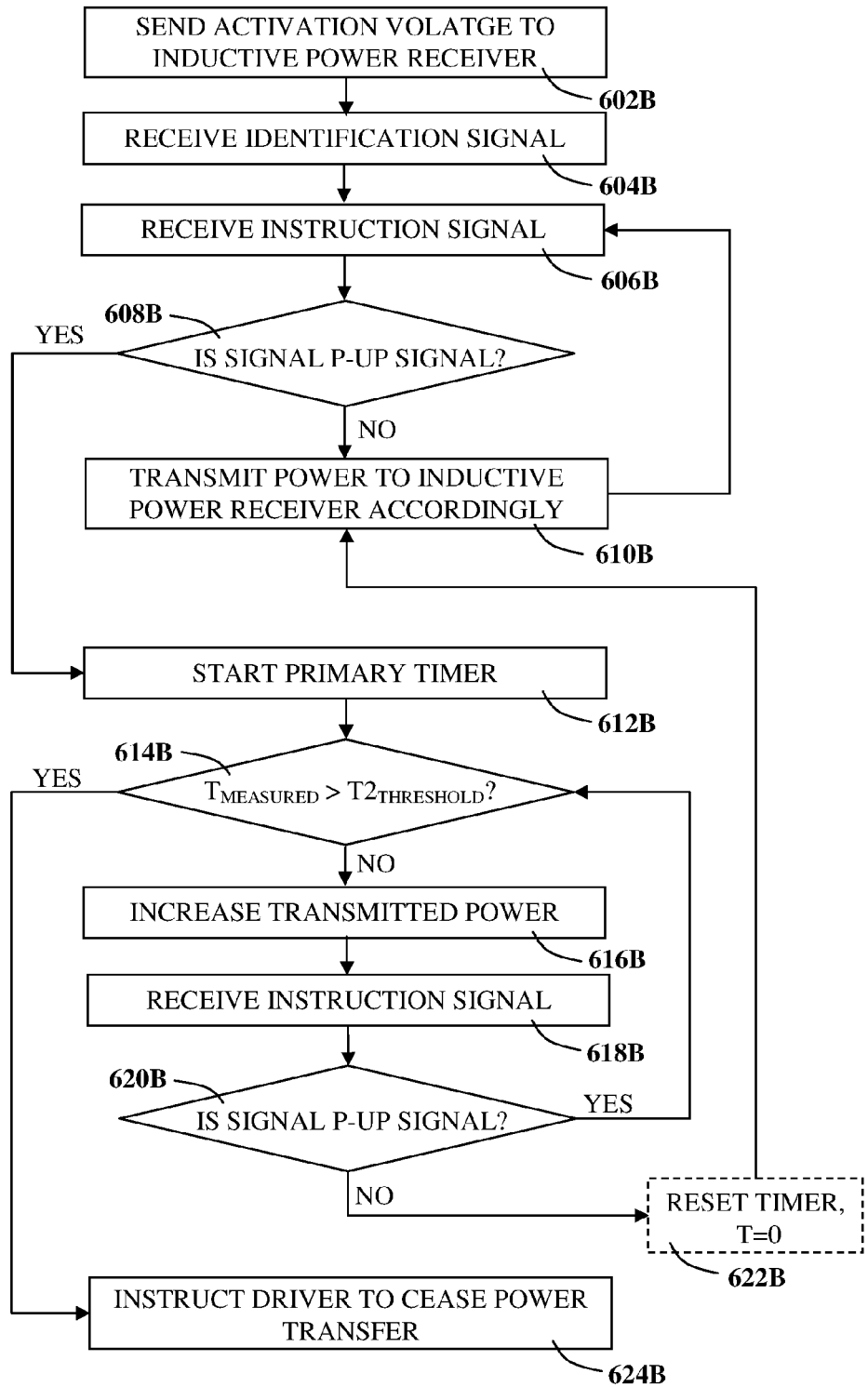
FIG. 6B is a flowchart showing a method for activating a safety mechanism regulating power increase, on the inductive power outlet side.

Power Outlet—Safety Mechanism Flowchart:

Reference is now made to the flowchart of FIG. 6B, representing selected actions of a method for providing a safety mechanism for regulating power transmission of an inductive power outlet of the disclosure.

The method comprises: sending an activation voltage to a detectable inductive power receiver 602B; receiving an identification signal from the inductive power receiver 604B; receiving instruction signal from the inductive power receiver 606B; comparing received instruction signal 608B; and, if received instruction signal is not a P-UP power increase signal, then, transmitting power to the inductive power receiver, accordingly 610B; otherwise, for a P-UP signal, starting the primary timer 612B; and comparing the elapsed time of successive P-UP transmissions with a pre-configured threshold time 614B; if elapsed time is less than the pre-configured threshold time T2, then increase the power transmitted accordingly 616B; and continue receiving instruction signals 618B; if instruction signal is a P-UP signal 620B, then repeating step 614B; else, optionally resetting the primary timer 622B to set the initial time to zero; and repeat step 610B; if the elapsed time is greater than the pre-configured threshold time, then instructing driver to cease power transfer.

Variously, the safety mechanism may be operable due to several reasons. For example, sensing successive power increase requests for a duration exceeding a pre-configured threshold value may indicate some malfunctioning of the inductive power transfer system. With reference to FIG. 3, the inductive power outlet may monitor the oscillating driving voltage and specifically the time elapse of consecutive power increase signals received from the inductive power receiver, possibly due to low rectified voltage at a given lateral misalignment of the primary and secondary inductive coils. In such a situation, the inductive power outlet may be configured to cease power transmission, which in many cases may cause the inductive power receiver to stop operating. Further, it may be appreciated that in a desktop environment, conductive bodies such as a paper clip, metal rule, the metal casing a stapler, a hole-punch or any metallic objects may be introduced between the inductive power outlet 200 and the secondary power receiving unit 300. The oscillating magnetic field produced by the primary coil 220 would then produce eddy currents in the conductive body heating it and thereby draining power from the primary coil 220. Such a power drain may be wasteful and/or dangerous.

Figure 7A:
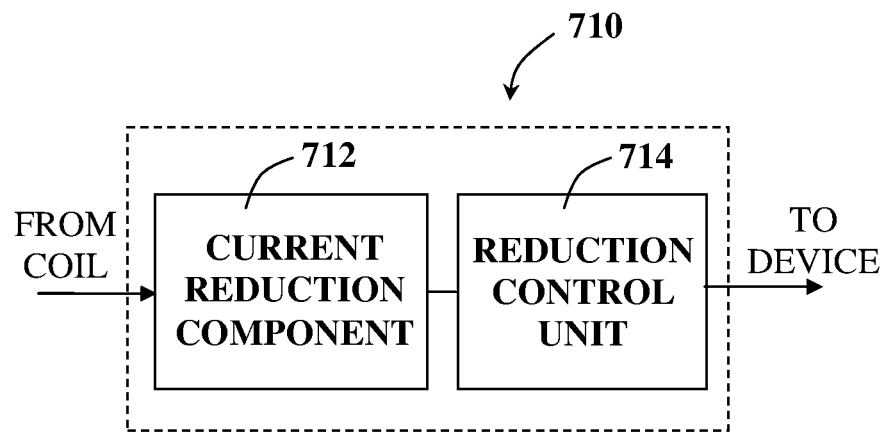
FIG. 7A is a block diagram representing selected components of a possible automatic current limiter for use in an inductive power receiver of the current disclosure.

Power Limit—Circuit & Components:

Reference is now made to FIG. 7A, which is a block diagram representing selected components of a possible automatic current limiter 710, for use in an inductive power receiver of the current disclosure.

The automatic current limiter 710 is configured and operable to manage current and to limit excessive current that may harm an electrical device. The automatic current limiter 710 may include various components providing the functionality of automatic current limiting including a current reduction component 712 and reduction control component circuitry 714. The current reduction component 712, for example an NCP380L component, high-side power distribution switch, having a 6-pin arrangement or the like, may serve to compare output current to the trigger current reference and to trigger the reduction control component 714.

Variously, the trigger current reference may have a value between 1.0 and 3.0 amperes for example. Particular trigger current values of about 900 milli-amperes, 1.0 amperes, 1.1 amperes, 1.2 amperes, 1.3 amperes, 1.4 amperes, 1.5 amperes, 2.0 amperes, 2.5 amperes, 3.0 amperes may be selected as required. Where appropriate trigger current values below 500 milli-amperes or higher than 3.0 amperes may be selected according to requirements.

Once activated, the reduction control component circuitry 714 may be configured to enable automatic current control for example limiting current not to exceed a threshold value.

Variously, the current limiter may maintain the output current within a range bounded by an upper value of between 100 milli-amperes and 3.0 amperes for example, particular upper bound values of about 600 milli-amperes, 700 milli-amperes 750 milli-amperes 800 milli-amperes, 900 milli-amperes, 1.0 amperes, 1.1 amperes, 1.2 amperes, 1.3 amperes, 1.4 amperes, 1.5 amperes, 2.0 amperes, 2.5 amperes, 3.0 amperes may be selected as required. Where appropriate values below 500 milli-amperes or higher than 3.0 amperes may be selected according to requirements.

If output load exceeds the trigger current reference value, then the output current may be reduced, for example to 750 milli-amperes or so, and maintained at a steady state, thereafter.

Figure 7B:
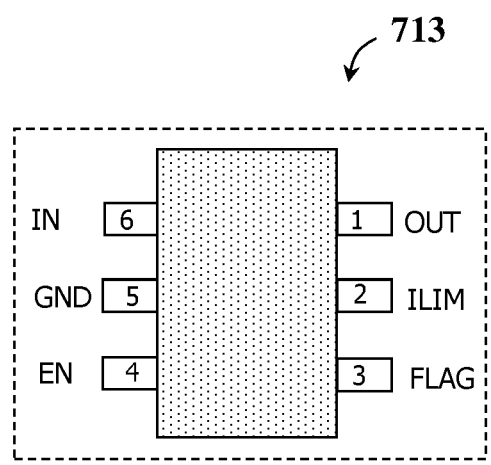
FIG. 7B is a block diagram representing a possible configuration of an example switch component as may be used in the automatic current limiter.

Reference is now made to the block diagram of FIG. 7B representing a possible configuration of an example switch component 713, as may be used in the automatic current limiter 710.

The switch component 713 may be a high side power-distribution switch for limiting the output current. Current-limiting may be used in applications such as laptop computers, tablet computers, desktop computers, hubs, set-top boxes, televisions, gaming products or the like. The NCP380L component, for example, may limit output current to a desired level by switching into a constant-current mode when the output load exceeds the current-limit threshold or a short circuit is detected. It is noted that although the NCP380L is described here for illustrative purposes, other current reduction components may be used as will occur to those skilled in the art.

Variously, the current-limit threshold may be internally determined or may be user adjustable in ranges between 100 milli-amperes and 1.5 amperes or the like, via an external resistor. An internal reverse-voltage detection comparator may disable the power switch if the output voltage is higher than the input voltage to protect devices on the input side of the switch. The power switch rise and fall times are controlled to minimize current ringing during switching.

Optionally, the switch component includes 6-pin arrangement. The OUT pin is of Output type for power-switch output voltage; the ILIM pin may be of Input type serving as an external resistor to set current-limit threshold with a possible resistance range of between 5 kilo-ohms and 250 kilo-ohms; the FLAG pin may be of Output type, used as a reduction indicator, controlling the switch by a logic enable input active high or low; the EN pin may be of Input type to enable or disable input; GND may be of Power type used as a ground connection; and IN may be of Input type for the power switch input voltage. Other switch components with other configurations may be selected as suit requirements.

Figure 7C:
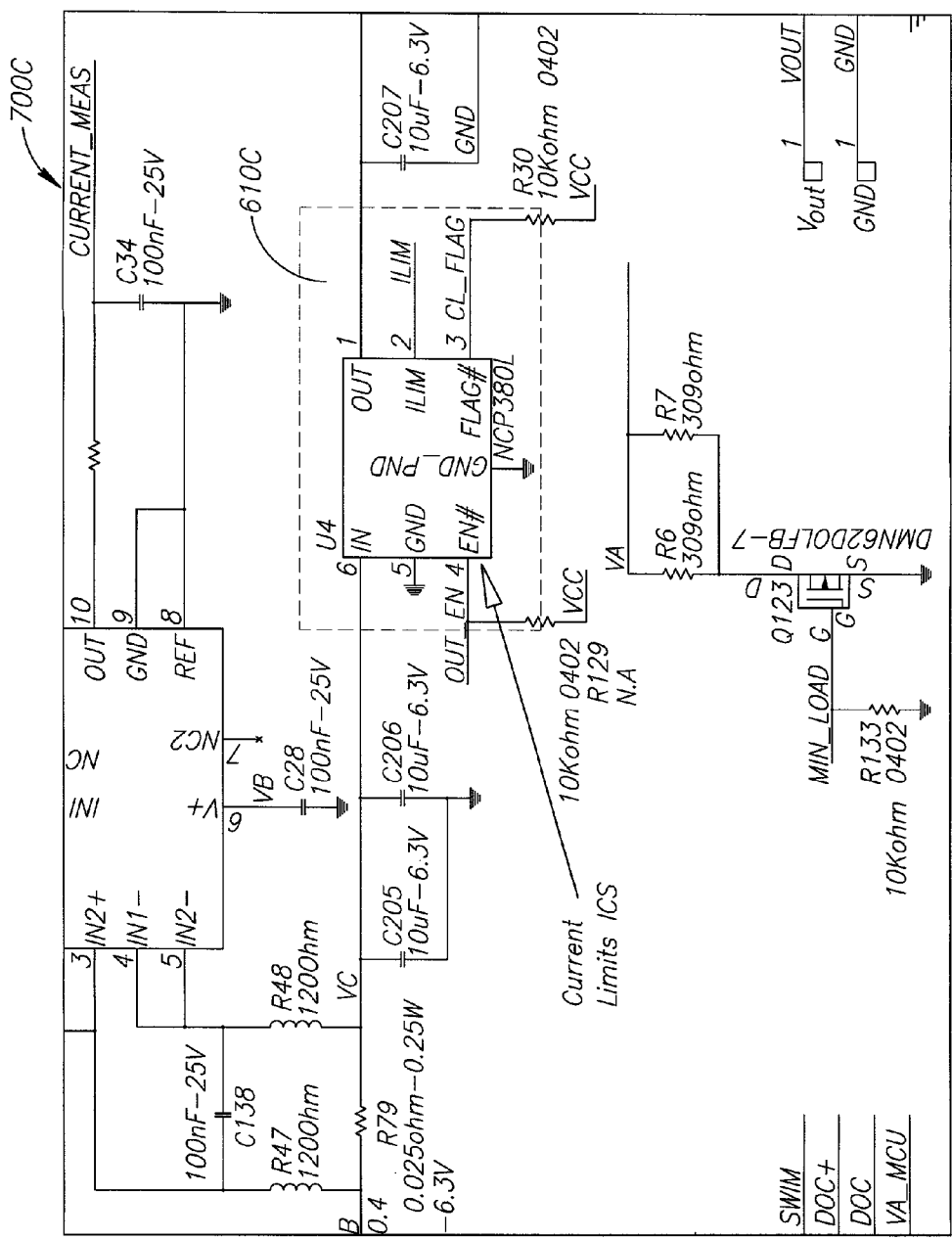
FIG. 7C is a circuit diagram of an inductive power transfer system according to another embodiment of the invention including a current limiter for regulating power increase requests.

Reference is now made to FIG. 7C, showing a circuit diagram of an inductive power receiver with a possible current limiter 700C incorporated.

The automatic current limiter 710C is configured and operable to manage current and to limit excessive current that may harm an electrical device. The automatic current limiter 710C may include various components providing the functionality of automatic current-limiting including a current reduction component 712 (FIG. 7A) and reduction control component circuitry 714 (FIG. 7A). The current reduction component 712 (FIG. 7A), for example an NCP380L component, high-side power distribution switch, having a 6-pin arrangement or the like, may serve to compare output current to the trigger current reference and to trigger the reduction control component 714 (FIG. 7A).

Variously, the trigger current reference may have a value between 1.0 and 3.0 amperes for example. Particular trigger current values of about 900 milli-amperes, 1.0 amperes, 1.1 amperes, 1.2 amperes, 1.3 amperes, 1.4 amperes, 1.5 amperes, 2.0 amperes, 2.5 amperes, 3.0 amperes may be selected as required. Where appropriate trigger current values below 500 milli-amperes or higher than 3.0 amperes may be selected according to requirements.

Once activated, the reduction control component circuitry 714 may be configured to enable automatic current control for example limiting current not to exceed a threshold value.

Variously, the current limiter may maintain the output current within a range bounded by an upper value of between 100 milli-amperes and 3.0 amperes for example, particular upper bound values of about 600 milli-amperes, 700 milli-amperes 750 milli-amperes 800 milli-amperes, 900 milli-amperes, 1.0 amperes, 1.1 amperes, 1.2 amperes, 1.3 amperes, 1.4 amperes, 1.5 amperes, 2.0 amperes, 2.5 amperes, 3.0 amperes may be selected as required. Where appropriate values below 500 milli-amperes or higher than 3.0 amperes may be selected according to requirements.

If output load exceeds the trigger current reference value, then the output current may be reduced, for example to 750 milli-amperes or so, and maintained at a steady state, thereafter.

The scope of the present invention is defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A power regulator for an inductive power receiver configured to provide energy to an electric load, said inductive power receiver comprising: at least one secondary inductive coil for forming an inductive couple with at least one primary inductive coil of an inductive power outlet; and a signal transmitter operable to send power control signals to said inductive power outlet, said power regulator comprising:
   - at least one power monitor operable to monitor power received by the electric load; and
   - at least one controller in communication with said power monitor and said signal transmitter, said controller operable to instruct said signal transmitter to transmit a power-increase signal if the power received by the electric load is below a minimum power-threshold;
   - wherein said power regulator further comprises:
   - a receiver-side signal-timer operable to measure duration of a series of consecutive power-increase signals; and
   - at least one time-triggered current limiter operable to limit the current required by the electric load thereby reducing said minimum power-threshold, said time-triggered current limiter in communication with said receiver-side signal-timer and configured to activate if said duration of the series of consecutive power-increase signals exceeds a maximum time-threshold.

2. The power regulator of claim 1, wherein said series of consecutive power-increase signals further comprises a combination of power increase signals and perpetuation signals.

3. The power regulator of claim 1, wherein said maximum time-threshold is smaller than a transmitter safety disconnection time.

4. The power regulator of claim 3, said inductive power outlet further comprising an outlet-side signal-timer operable to measure outlet-side duration of a series of consecutive power increase signals received from said signal transmitter, said inductive power outlet operable to terminate operation if the outlet-side duration exceeds said transmitter safety disconnection time.

5. The power regulator of claim 1, wherein said signal transmitter comprises a signal transmission circuit comprising at least one electrical element selectively connectable to the secondary inductor by a switching unit, wherein the switching unit is configured to connect the electrical element to the secondary inductor with a characteristic frequency thereby producing a pulse of detectable peaks in primary voltage or primary current having the characteristic frequency.

6. The power regulator of claim 5, wherein the characteristic frequency of said power-increase signal is about 8 kilohertz.

7. The power regulator of claim 1, wherein said signal transmitter comprises a signal transmission circuit comprising at least one electrical element selectively connectable to the secondary inductor by a switching unit, wherein the switching unit is configured to connect the electrical element to the secondary inductor according to a differential bi-phase encoding scheme modulating data bits.

8. The power regulator of claim 7, wherein said power-increase signal comprises a data byte comprising a start bit, 8 data bits, a parity bit, and a single stop bit.

9. The power regulator of claim 8, wherein said data byte comprises a signed integer value providing a control error packet.

10. A method for regulating power received by an electric load from at least one inductive power outlet via an inductive power receiver, said inductive power receiver comprising:

at least one secondary inductive coil for forming an inductive couple with at least one primary inductive coil associated with said at least one inductive power outlet; and a power regulator operable to monitor power received by the electric load and to instruct a signal transmitter to transmit a power-increase signal to said at least one inductive power outlet if the power received by the electric load is below a minimum power-threshold;

the method comprising:
measuring a duration of a series of consecutive power-increase signals; comparing the duration of the series of consecutive power-increase signals with a maximum threshold; and limiting the current required by the electric load if the duration of the series of consecutive power-increase signals exceeds the maximum threshold thereby reducing said minimum power-threshold.

11. The method of claim 10, further comprising monitoring power received by the electric load, said monitoring comprising one or more of:

comparing power received to said minimum power-threshold; and comparing power received to a maximum power-threshold.

12. The method of claim 10, further comprising transmitting control signals to regulate the power received by the electric load.

13. The method of claim 10, wherein measuring the duration of the series of consecutive power-increase signals comprises:

starting a receiver-side signal-timer when a first of a series of power-increase signals is transmitted; and resetting said receiver-side signal-timer whenever any other control signal is transmitted.

14. The method of claim 10, wherein said control signals are selected from at least one of:

a power-increase signal transmitted if the power received by the electric load is below a minimum power-threshold;

a power-decrease signal transmitted if the power received by the electric load is above a maximum power-threshold; and a perpetuation signal transmitted if the power received by the electric load is above the minimum power-threshold and below the maximum power-threshold.

15. The method of claim 10, wherein measuring the duration of the series of consecutive power-increase signals comprises:

starting a receiver-side signal-timer when a first of a series of a power-increase signals is transmitted; and resetting said receiver-side signal-timer whenever a power-decrease signal is transmitted.

16. The method of claim 10, wherein measuring the duration of the series of consecutive power-increase signals comprises:

starting a receiver-side signal-timer when the power received by the electric load drops below a minimum power-threshold; and resetting said receiver-side signal-timer when the power received by the electric load rises above the minimum power-threshold.

17. The method of claim 10, wherein limiting the current comprises activating a time-triggered current limiter.

18. A power regulator for an inductive power receiver configured to provide energy to an electric load, said inductive power receiver comprising: at least one secondary inductive coil for forming an inductive couple with at least one primary inductive coil of an inductive power outlet; and a signal transmitter operable to send power control signals to said inductive power outlet, said power regulator comprising:

at least one power monitor operable to monitor power received by the electric load; and at least one controller in communication with said power monitor and said signal transmitter, said controller operable to instruct said signal transmitter to transmit a power-increase signal if the power received by the electric load is below a minimum power-threshold;

wherein said power regulator further comprises:
a receiver-side signal-counter operable to count a total-number of a series of consecutive power-increase signals; and at least one count-triggered current limiter operable to limit the current required by the electric load thereby reducing said minimum power-threshold, said count-triggered current limiter in communication with said receiver-side signal-counter and configured to activate if said total-number of the series of consecutive power-increase signals exceeds a maximum count-threshold.

19. The power regulator of claim 18, wherein said series of consecutive power-increase signals further comprises a combination of power increase signals and perpetuation signals.

20. The power regulator of claim 18, wherein said maximum count-threshold is smaller than a transmitter safety disconnection count, said inductive power outlet further comprising an outlet-side signal-counter operable to count outlet-side total-number of a series of consecutive power increase signals received from said signal transmitter,
    said inductive power outlet operable to terminate operation if the outlet-side total-count exceeds said transmitter safety disconnection count.

* * * * *